(12) United States Patent
Fujikawa et al.

(10) Patent No.: US 10,544,341 B2
(45) Date of Patent: Jan. 28, 2020

(54) THERMALLY CONDUCTIVE POLYMER COMPOSITION AND THERMALLY CONDUCTIVE MOLDED OBJECT

(71) Applicants: NITTO DENKO CORPORATION, Ibaraki-shi, Osaka (JP); NITTO SHINKO CORPORATION, Sakai-shi, Fukui (JP)

(72) Inventors: Kenichi Fujikawa, Osaka (JP); Yoshiharu Hatakeyama, Osaka (JP); Miho Yamaguchi, Osaka (JP); Yuji Yamagishi, Fukui (JP); Akihiro Oohashi, Fukui (JP)

(73) Assignees: NITTO DENKO CORPORATION, Osaka (JP); NITTO SHINKO CORPORATION, Fukui (JP)

( * ) Notice: Subject to any disclaimer, the term of this patent is extended or adjusted under 35 U.S.C. 154(b) by 42 days.

(21) Appl. No.: 15/307,763

(22) PCT Filed: Dec. 16, 2014

(86) PCT No.: PCT/JP2014/083294
§ 371 (c)(1),
(2) Date: Oct. 28, 2016

(87) PCT Pub. No.: WO2015/166609
PCT Pub. Date: Nov. 5, 2015

(65) Prior Publication Data
US 2017/0081579 A1 Mar. 23, 2017

(30) Foreign Application Priority Data
Apr. 30, 2014 (JP) ................................. 2014-093649

(51) Int. Cl.
*C09K 5/14* (2006.01)
*C08K 3/38* (2006.01)
(Continued)

(52) U.S. Cl.
CPC .................. *C09K 5/14* (2013.01); *C08K 3/22* (2013.01); *C08K 3/28* (2013.01);
(Continued)

(58) Field of Classification Search
CPC ... C09K 5/14; C08K 3/38; C08K 3/04; C08K 3/22; C08K 3/28; C08K 3/36;
(Continued)

(56) References Cited

U.S. PATENT DOCUMENTS

| 9,349,931 B2 | 5/2016 | Nishiyama et al. |
| 2008/0153960 A1 | 6/2008 | Meneghetti et al. |
| 2014/0015000 A1 | 1/2014 | Nishiyama et al. |

FOREIGN PATENT DOCUMENTS

| CN | 103429634 A | 12/2013 |
| JP | 2001-348488 A | 12/2001 |
(Continued)

OTHER PUBLICATIONS

K. C. Yung et al., "Enhanced Thermal Conductivity of Boron Nitride Epoxy-Matrix Composite Through Multi-Modal Particle Size Mixing", Journal of Applied Polymer Science, vol. 106, No. 6, Dec. 15 2007, pp. 3587-3591, XP055184924.
(Continued)

*Primary Examiner* — David T Karst
(74) *Attorney, Agent, or Firm* — Sughrue Mion, PLLC

(57) ABSTRACT

The present invention provides a thermal conductive polymer composition with low probability for mixing of an air bubble in a thermal conductive molded article, which is a thermal conductive polymer composition including thermal conductive inorganic particles having a specific particle size distribution and an electrically insulating polymer.

3 Claims, 1 Drawing Sheet

(51) Int. Cl.
*C08K 3/04* (2006.01)
*C08K 3/22* (2006.01)
*C08K 3/28* (2006.01)
*C08K 3/36* (2006.01)
*C08J 3/20* (2006.01)
*C08J 5/18* (2006.01)
*C08L 63/00* (2006.01)

(52) U.S. Cl.
CPC ............... *C08K 2003/2227* (2013.01); *C08K 2003/282* (2013.01); *C08K 2201/001* (2013.01)

(58) Field of Classification Search
CPC ...... C08K 2003/2227; C08K 2201/001; C08K 2003/282; C08J 3/20; C08J 5/18; C08J 2363/00
USPC .......................................................... 523/440
See application file for complete search history.

(56) References Cited

FOREIGN PATENT DOCUMENTS

| JP | 2005-343983 A | 12/2005 |
|----|---------------|---------|
| JP | 2008-189818 A | 8/2008 |
| JP | 2011-121193 A | 6/2011 |
| JP | 2012-251023 A | 12/2012 |
| JP | 2013-18991 A | 1/2013 |
| JP | 2013-91179 A | 5/2013 |
| JP | 2013-234313 A | 11/2013 |
| WO | 2008/042446 A2 | 4/2008 |
| WO | 2013/065758 A1 | 3/2015 |

OTHER PUBLICATIONS

Extended European Search Report dated Mar. 14, 2017 issued by the European Patent Office in counterpart European Patent Application No. 14890606.8.

International Search Report, issued by International Searching Authority in corresponding International Application No. PCT/JP2014/083294, dated Mar. 24, 2015, (PCT/ISA/210).

Written Opinion, issued by International Searching Authority in corresponding International Application No. PCT/JP2014/083294, dated Mar. 24, 2015, (PCT/ISA/237).

Third Party Submission mailed by the Japanese Patent Office dated Sep. 15, 2017 in counterpart Japanese Patent Application No. 2014-093649.

Notification of Reasons for Refusal dated May 11, 2018 by the Japanese Patent Office in counterpart Japanese Patent Application No. 2014-093649.

Notification of First Office Action Aug. 20, 2018, from the State Intellectual Property Office of People's Republic of China in counterpart Application No. 201480078320.7.

Notification of Second Office Action dated May 23, 2019, from the State Intellectual Property Office of People's Republic of China in counterpart Application No. 201480078320.7.

THERMALLY CONDUCTIVE POLYMER COMPOSITION AND THERMALLY CONDUCTIVE MOLDED OBJECT

TECHNICAL FIELD

The present invention relates to a thermal conductive polymer composition including thermal conductive inorganic particles and an electrically insulating polymer, and a thermal conductive molded article in which a part or the whole thereof is formed of the thermal conductive polymer composition.

BACKGROUND ART

In recent years, with respect to an electronic device, etc., demands for space saving of the installation place and weight reduction are increasing.

In addition, along with an increase in the localization of control mechanism or the cloud utilization, the demand for smaller size and higher performance of an electronic device is growing.

Consequently, the quantity of heat generated from the device is increased, expanding the opportunities to require excellent thermal conductivity.

For example, in the technical field of a semiconductor device used for, e.g., a high-brightness LED, a personal computer, an automotive motor control mechanism, or a device utilizing power electronic technology of converting and controlling electric power, it is strongly demanded to exhibit excellent thermal conductivity.

A molded article excellent in thermal conductivity (thermal conductive molded article) utilized for heat dissipation in the above-described field is required to have high electrical insulation, in addition to high thermal conductivity.

In a thermal conductive molded article used for this type of application, in many cases, a part or the whole thereof is often formed of a thermal conductive polymer composition containing a base polymer having electrical insulation and thermal conductive inorganic particles (hereinafter, sometimes simply referred to as "inorganic particles") having higher thermal conductivity than the base polymer.

Among such thermal conductive polymer compositions (hereinafter, sometimes simply referred to as "polymer composition"), an epoxy resin composition employing an epoxy resin for the base polymer is excellent not only in the thermal conductivity but also in the adhesiveness, electrical insulation, strength, etc. and therefore, is extensively used.

Specifically, the epoxy resin composition is widely used in, e.g., an encapsulating material of a semiconductor device or a prepreg sheet for bonding a semiconductor device to a heat dissipater.

In the thermal conductive polymer composition, usually, as the content ratio of the inorganic particles is higher and as the thermal conductivity of the inorganic particles contained is higher, excellent thermal conductivity is exhibited.

Under such a background, attempts are being made to incorporate boron nitride particles or aluminum nitride particles, which exhibit particularly high thermal conductivity among inorganic particles, into the thermal conductive polymer composition in a high ratio.

For example, in Patent Document 1, boron nitride particles, etc. exhibiting high thermal conductivity among inorganic particles is packed in a closest packing state with an attempt to make the thermal conductivity of an epoxy resin molded article higher than ever before.

BACKGROUND ART DOCUMENT

Patent Document

Patent Document 1: JP-A-2001-348488

SUMMARY OF THE INVENTION

Problems that the Invention is to Solve

A polymer composition filled with a high volume of inorganic particles makes it possible for a thermal conductive molded article formed of the polymer composition to exhibit excellent thermal conductivity.

On the other hand, when a polymer composition is filled with a high volume of inorganic particles, for example, in the case of presenting a heated and molten state so as to manufacture a molded article, the polymer composition cannot exhibit sufficient fluidity, and an air bubble is likely to remain in the molded article and form a void in the inside thereof.

Even in the case where the polymer composition is formed into varnish with an organic solvent, when filled with a high volume of inorganic particles, an air bubble is readily formed in the inside after removing the organic solvent.

Accordingly, in all cases, an air bubble is likely to be mixed in the thermal conductive molded article.

The presence of an air bubble causes reduction in the thermal conductivity and raises a probability of producing a problem in the strength or electrical insulation of the thermal conductive molded article.

The present invention has been made in consideration of these problems, and an object of the present invention is to provide a polymer composition with low probability for void formation inside a thermal conductive molded article, despite a high volume filling of inorganic particles, and in turn, provide a thermal conductive molded article exhibiting excellent properties in terms of thermal conductivity, etc.

Means for Solving the Problems

In order to achieve such an object, a thermal conductive polymer composition of the present invention is a thermal conductive polymer composition including: thermal conductive inorganic particles; and an electrically insulating polymer, in which the thermal conductive inorganic particles include a first component containing boron nitride particles in an aggregated state and a second component which is a component other than the first component, a content of the second component in the thermal conductive inorganic particles is from 5 to 55 vol %, and the thermal conductive inorganic particles satisfy all requirements of the following (1) to (3):

(1) to contain particles having a particle diameter of 10 μm to 400 μm in an amount of 80 vol % or more,
(2) to contain particles having a particle diameter of 20 μm to 400 μm in an amount of 60 vol % or more, and
(3) to contain particles having a particle diameter of 30 μm to 400 μm in an amount of 40 vol % or more.

Additionally, in order to achieve such an object, a thermal conductive molded article of the present invention is a thermal conductive molded article in which a part or the whole thereof is formed of the above-described thermal conductive polymer composition.

Advantage of the Invention

In the present invention, the thermal conductive inorganic particles have a predetermined particle size distribution, the first component contains boron nitride particles in an aggregated state, and the second component is contained in a predetermined ratio in the thermal conductive polymer composition.

Consequently, when the thermal conductive polymer composition is put into, for example, a heated and molten state at the time of formation of a thermal conductive molded article, the polymer composition can exhibit excellent fluidity.

That is, according to the present invention, a polymer composition with low probability for void formation in a thermal conductive molded article can be provided.

MODE FOR CARRYING OUT THE INVENTION

Figure 1A:
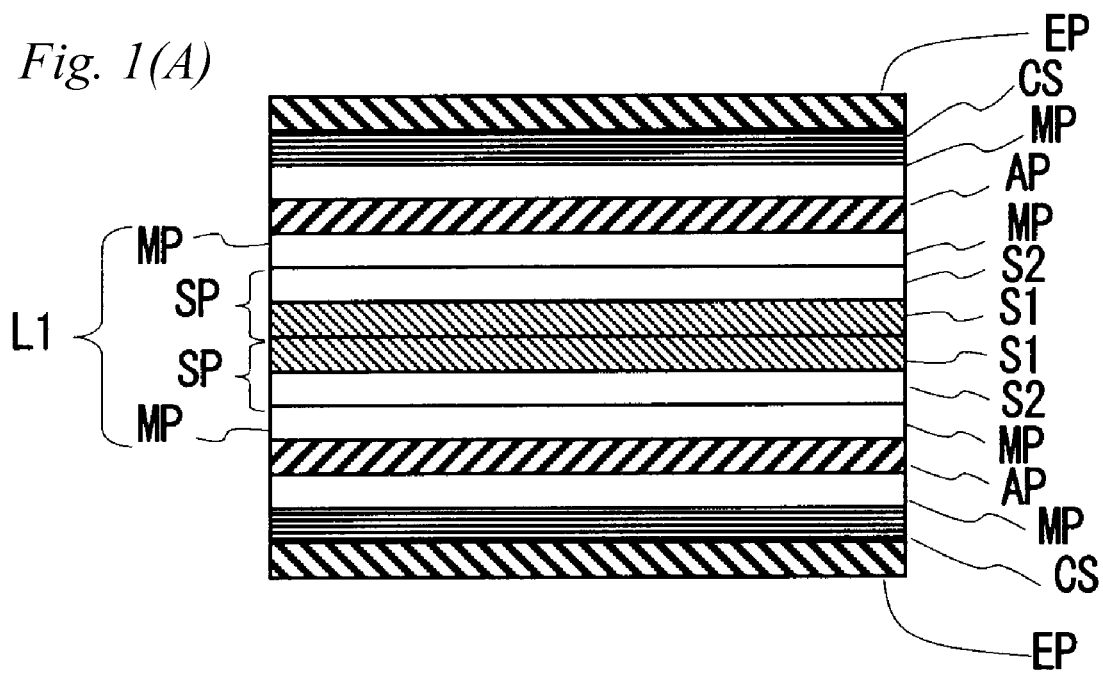
FIGS. 1(A) and 1(B) are views schematically showing press sets for producing a sheet-like molded article.

The embodiment of the present invention is described below.

The thermal conductive polymer composition of this embodiment contains a base polymer having electrical insulation and thermal conductive inorganic particles.

In the thermal conductive polymer composition of this embodiment, the inorganic particles include a first component containing boron nitride particles in an aggregated state and a second component which is a component other than the first component.

In the thermal conductive polymer composition of this embodiment, the content of the second component in the thermal conductive inorganic particles is from 5 to 55 vol %, and the thermal conductive inorganic particles containing the first component and the second component are incorporated to provide a specific particle size distribution.

As the boron nitride particles in an aggregated state constituting the first component, for example, secondary particles resulting from aggregation of primary boron nitride particles may be employed.

The shape of the primary particle is not particularly limited and may be a bulk shape, a needle shape, or a plate shape.

In the case where the shape of the primary particle is a plate shape, the particle may be scale-shaped particle having a relatively small thickness.

The plate-shaped primary particle may have a circular or hexagonal shape as viewed from the thickness direction.

The plate-shaped primary particle may have such a shape that thin plates differing in size are stacked and a stepped or cleaved partial structure is provided in the outer peripheral edge thereof.

In the plate-shaped primary particle, the shape as viewed from a plane direction orthogonal to the thickness direction of the plate needs not be a straight shape but may be a bent straight line shape or a curved shape.

The secondary particle resulting from aggregation of primary particles above is not particularly limited, but an irregularly shaped or spherical particle can be employed.

Here, as the secondary particle according to this embodiment, a particle containing, as an impurity, a component for binding primary particles with each other, in addition to impurities such as oxygen and hydrogen usually contained in the primary particle, other than boron and nitrogen, may be employed.

The first component may also be constructed from two or more kinds of secondary particles and, for example, may be a mixture obtained by mixing two kinds of secondary particles differing in the primary particle shape, the aggregation method, etc.

Here, as for the first component, a particle having a specific surface area of 5 $m^2/g$ or less is preferably used so as to impart good fluidity to the thermal conductive polymer composition at the time of high-volume filling together with the second component described above into the thermal conductive polymer composition.

For more unfailingly imparting good fluidity to the thermal conductive polymer composition, the specific surface area of the first component is preferably 4 $m^2/g$ or less, more preferably 3.5 $m^2/g$ or less.

The lower limit value of the specific surface area of the first component is 0.5 $m^2/g$.

In addition, as for the first component, a particle having a bulk density ("Apparent Density" of JIS K5101-12-1) of, for example, 0.1 $g/cm^3$ or more may be employed.

The bulk density of the first component is preferably 0.15 $g/cm^3$ or more, more preferably 0.2 $g/cm^3$ or more.

As for the first component, a particle having a bulk density ("Apparent Density" of JIS K5101-12-1) of, for example, 2.3 $g/cm^3$ or less may be employed.

The bulk density of the first component is preferably 2.0 $g/cm^3$ or less, more preferably 1.8 $g/cm^3$ or less, still more preferably 1.5 $g/cm^3$ or less.

On the other hand, the thermal conductive inorganic particles constituting the second component is not particularly limited as long as they are thermal conductive inorganic particles other than the first component, but examples of the material thereof include a carbide, a nitride, an oxide, a metal and a carbon-based substance.

Examples of the carbide include silicon carbide, boron carbide, aluminum carbide, titanium carbide, and tungsten carbide.

Examples of the nitride include silicon nitride, aluminum nitride, gallium nitride, chromium nitride, tungsten nitride, magnesium nitride, molybdenum nitride, and lithium nitride.

In this embodiment, for example, a boron nitride particle in a non-aggregated state may be incorporated as the second component into the thermal conductive polymer composition.

Examples of the oxide include silicon oxide (silica), aluminum oxide (alumina), magnesium oxide (magnesia), titanium oxide, cerium oxide, and zirconium oxide.

In addition, examples of the oxide include an oxide doped with a metal ion such as indium tin oxide and antimony tin oxide.

Examples of the hydroxide include aluminum hydroxide, magnesium hydroxide, and zinc hydroxide.

Examples of the metal include aluminum, nickel, tin, iron, copper, silver, gold, platinum, palladium, and an alloy based on such a metal.

Examples of the carbon-based substance include carbon black, graphite, diamond, a fullerene, carbon nanotube, carbon nanofiber, carbon nanohorn, and carbon microcoil.

As for the particle composed of the material described above, one kind thereof may constitute alone the second component, or two or more kinds thereof may constitute the second component.

Among others, as the thermal conductive inorganic particles constituting the second component, thermal conductive inorganic particles having 2 W/mK or more, particularly 20 W/mK or more, are preferably used, and from the material side, the particles are preferably particles of any one of a nitride, an oxide, and a carbon-based substance, more preferably any one of aluminum nitride particles, aluminum oxide particles, and diamond particles.

Thermal conductive inorganic particles having less than 2 W/mK may be incorporated into the thermal conductive inorganic particles, but in this case, the thermal conductive inorganic particles having less than 2 W/mK is incorporated to account for a proportion of less than 5 vol % of all thermal conductive inorganic particles.

Furthermore, as for the second component, a particle having a specific surface area of 0.5 $m^2/g$ or less as described above is preferably used so as to impart good fluidity to the thermal conductive polymer composition at the time of high-volume filling together with the first component described above into the thermal conductive polymer composition.

For more unfailingly imparting good fluidity to the thermal conductive polymer composition, the specific surface area of the second component is preferably 0.3 $m^2/g$ or less, more preferably 0.2 $m^2/g$ or less.

The lower limit value of the specific surface area of the second component is usually 0.01 $m^2/g$.

The specific surface area of the first component or the second component can be determined usually by a nitrogen adsorption method (JIS Z8830:2010), and unless otherwise indicated, the term "specific surface area" as used in the present description means a specific surface area determined by the nitrogen adsorption method.

The first component and the second component may be subjected to a surface treatment, if desired, and examples of the surface treatment include a method of chemically bonding an organic material or an inorganic material to the particle surface and a method of forming a surface coating with an organic material or an inorganic material.

Above all, in the case of employing aluminum nitride particles as the second component, it is preferable to apply a surface treatment for preventing hydrolysis of the aluminum nitride particles.

Here, in the case where inorganic particles previously subjected to a surface treatment are employed for the first component or the second component, the "specific surface area" above is not determined on the inorganic particles before the surface treatment but is determined on the inorganic particles after the surface treatment.

The first component and the second component usually have a volume average particle diameter of 1 to 300 μm, and in particular, the second component preferably has a volume average particle diameter of 10 μm or more.

The volume average particle diameter can be measured by a laser diffraction/scattering method and may be measured, for example, by using a laser diffraction particle size analyzer (SALD-2100, manufactured by SHIMADZU Corporation).

As for the second component, in order for the thermal conductive molded article formed of the polymer composition of this embodiment to exhibit excellent thermal conductivity, the volume average particle diameter is, as described above, preferably 10 μm or more, more preferably 15 μm or more, still more preferably 20 μm or more.

In view of the above-described thermal conductivity, the volume average particle diameter of the second component is yet still more preferably 25 μm or more, even yet still more preferably 30 μm or more.

In the second component, the volume average particle diameter as determined by the laser diffraction/scattering method is usually 500 μm or less.

With respect to the inorganic particles constituting the second component or the primary particle for the aggregated particle constituting the first component, the information regarding the shape of the particle, such as aspect ratio and degree of sphericity, and the information on particle size distribution, volume average particle diameter, etc. can be determined by an image analytical method and, for example, can be confirmed using a particle image analyzer, Morphologi G3 (manufactured by Malvern).

In view of the above-described thermal conductivity, the volume average particle diameter of the second component is preferably 10 μm or more, more preferably 15 μm or more, still more preferably 20 μm or more.

The volume average particle diameter of the second component as determined by an image analytical method is yet still more preferably 25 μm or more, even yet still more preferably 30 μm or more, and most preferably 40 μm or more.

Usually, the volume average particle diameter of the second component as determined by an image analytical method is 500 μm or less, and the volume average particle diameter is preferably 200 μm or less, more preferably 100 μm or less.

As for the inorganic particles constituting the second component, in order for the thermal conductive polymer composition to exhibit good fluidity, the area/circularity (HS) as determined by the image analytical method is preferably 0.5 or more, more preferably 0.55 or more, still more preferably 0.6 or more.

The upper limit value of the area/circularity (HS) is usually 1.0.

In order for the thermal conductive polymer composition to exhibit good fluidity, it is important that the thermal conductive inorganic particles are contained in the thermal conductive polymer composition while making the particle size distribution as determined by the image analytical method above to fall into a specific state.

Specifically, it is important that in the particle size distribution, particles having a particle diameter of 10 μm to 400 μm account for 80 vol % or more, and the particles described above preferably account for 82 vol % or more.

In addition, it is important that in the particle size distribution, particles having a particle diameter of 20 μm to 400 μm account for 60 vol % or more, and the particles described above preferably account for 61 vol % or more.

Furthermore, it is important that in the particle size distribution, particles having a particle diameter of 30 μm to 400 μm account for 40 vol % or more, and the particles described above preferably account for 45 vol % or more.

In the particle size distribution, the content of particles having a particle diameter of 40 μm or more is preferably 30 vol % or more.

In addition, in the particle size distribution, the content of particles having a particle diameter of 50 μm or more is preferably 20 vol % or more.

The particle size distribution is preferably in a state of being substantially free of particles having a size exceeding 300 µm, more preferably in a state of being substantially free of particles having a size exceeding 200 µm.

As described above, in the polymer composition of this embodiment, a fine particle of less than 30 µm can be incorporated into the polymer composition as long as its proportion is less than 60 vol % of the total of thermal conductive inorganic particles.

In the case of incorporating such a fine particle into the polymer composition, the proportion of particles having a particle diameter of less than 30 µm is preferably from 25 to 52 vol %, more preferably from 27 to 45 vol %, of the total of the above-described thermal conductive inorganic particles.

The proportion of particles having a particle diameter of less than 10 µm is preferably from 7 to 16 vol %, more preferably from 9 to 15 vol %, of the total of the above-described thermal conductive inorganic particles.

The proportion of particles having a particle diameter of 10 µm or more and less than 20 µm is preferably from 10 to 22 vol %, more preferably from 11 to 20 vol %, of the total of the above-described thermal conductive inorganic particles.

The ratio (B/A) of (B) particles having a particle diameter of 10 µm or more and less than 20 µm to (A) particles having a particle diameter of less than 10 µm is preferably from 1.2 to 1.3.

Furthermore, the proportion of particles having a particle diameter of 20 µm or more and less than 30 µm is preferably from 7 to 16 vol %, more preferably from 7 to 14 vol %, of the total of the above-described thermal conductive inorganic particles.

A fine inorganic particle of 1 µm or less may be appropriately incorporated into the polymer composition of this embodiment so as to, for example, enhance the electrical insulation of the thermal conductive molded article, but the fine inorganic particle of 1 µm or less is preferably incorporated to account for a proportion of 5 mass % or less, preferably incorporated to account for 2 mass % or less, of the solid content of the polymer composition.

Examples of the electrically insulating polymer constituting the polymer composition together with such inorganic particles include a thermoplastic resin, a thermosetting resin, and rubber.

The electrically insulating polymer is preferably a polymer having a volume resistivity of $1 \times 10^{11}$ Ω·cm or more as determined according to JIS C2139:2008, and the volume resistivity of the electrically insulating polymer in this embodiment is preferably $1 \times 10^{12}$ Ω·cm or more, more preferably $1 \times 10^{13}$ Ω·cm or more.

The thermoplastic resin for constituting the polymer composition is not particularly limited but examples thereof include fluororesin, acrylic resin, polystyrene resin, polyester resin, polyacrylonitrile resin, maleimide resin, polyvinyl acetate resin, polyethylene resin, polypropylene resin, an ethylene/vinyl acetate copolymer, polyvinyl alcohol resin, polyamide resin, polyvinyl chloride resin, polyacetal resin, polycarbonate resin, polyphenylene oxide resin, polyphenylene sulfide resin, polyether ether ketone resin (PEEK), polyallylsulfone resin, thermoplastic polyimide resin, thermoplastic urethane resin, polyetherimide resin, polymethylpentene resin, cellulose resin, and a liquid crystal polymer.

The thermosetting resin is not particularly limited and examples thereof include epoxy resin, thermosetting polyimide resin, phenol resin, phenoxy resin, urea resin, melamine resin, diallyl phthalate resin, silicone resin, and thermosetting urethane resin.

Examples of the rubber include natural rubber, styrene/butadiene rubber, ethylene/α-olefin rubber, chloroprene rubber, silicone rubber, and fluororubber.

In the polymer composition of this embodiment, one of the above-described resins or rubbers may be used alone, or two or more kinds thereof may be used in combination.

In order for the polymer composition to exhibit excellent thermal conductivity, among the electrically insulating polymers described above, those having a liquid crystalline structure such as mesogen skeleton are preferred.

In addition, in order for the polymer composition to exhibit excellent properties in terms of adhesiveness, heat resistance, electrical insulation, etc., among the electrically insulating polymers described above, an epoxy resin or a phenol resin is preferably employed.

At the time of incorporation of the epoxy resin into the polymer composition of this embodiment, an epoxy resin that is liquid, semi-solid or solid at normal temperature (for example, 20° C.) may be employed.

Specifically, examples of the epoxy resin include an aromatic epoxy resin such as bisphenol-type epoxy resin (e.g., bisphenol A epoxy resin, bisphenol F epoxy resin, bisphenol S epoxy resin, hydrogenated bisphenol A epoxy resin, dimer acid-modified bisphenol epoxy resin), novolak-type epoxy resin (e.g., phenol novolak epoxy resin, cresol novolak epoxy resin, biphenyl epoxy resin), naphthalene-type epoxy resin, fluorene-type epoxy resin (e.g., bisaryl fluorene epoxy resin), and triphenylmethane-type epoxy resin (e.g., trishydroxyphenylmethane epoxy resin); a nitrogen-containing cyclic epoxy resin such as triepoxypropyl isocyanurate (triglycidyl isocyanurate) and hydantoin epoxy resin; an aliphatic epoxy resin; an alicyclic epoxy resin (for example, a dicyclo ring-type epoxy resin such as dicyclopentadiene epoxy resin); a glycidylether-type epoxy resin; and a glycidylamine-type epoxy resin.

In the epoxy resin, the epoxy equivalent weight as determined according to JIS K 7236:2009 is, for example, preferably 100 g/eq or more, more preferably 130 g/eq or more, especially preferably 150 g/eq or more.

The epoxy equivalent of the epoxy resin is, for example, preferably 10,000 g/eq or less, more preferably 9,000 g/eq or less, especially preferably 8,000 g/eq or less.

Above all, the epoxy equivalent of the epoxy resin is preferably 5,000 g/eq or less, especially preferably 1,000 g/eq or less.

In the case where the epoxy resin is solid at normal temperature, the softening point is, for example, preferably 20° C. or more, more preferably 40° C. or more.

The softening point of the epoxy resin is, for example, preferably 130° C. or less, more preferably 90° C. or less.

Among the epoxy resins described above, the epoxy resin incorporated into the polymer composition of this embodiment is preferably a triphenylmethane-type epoxy resin or an epoxy resin having a skeleton represented by the following formula (1):

[Chem. 1]

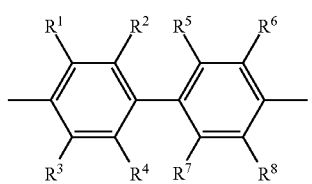

(1)

(in which each of "$R^1$" to "$R^8$" independently represents a hydrogen atom, a hydrocarbon group having a carbon number of 1 to 6, or a methoxy group).

The blending ratio of the epoxy resin in the polymer composition of this embodiment is, for example, preferably 1 part by mass or more, more preferably 2 parts by mass or more, still more preferably 3 parts by mass or more, especially preferably 5 parts by mass or more, per 100 parts by mass of the thermal conductive inorganic particles.

The blending ratio of the epoxy resin in the polymer composition of this embodiment is, for example, preferably 100 parts by mass or less, more preferably 50 parts by mass or less, still more preferably 20 parts by mass or less, especially preferably 10 parts by mass or less, per 100 parts by mass of the thermal conductive inorganic particles.

At the time of incorporation of the epoxy resin into the polymer composition of this embodiment, a curing agent therefor may be further incorporated.

As the curing agent, for example, a latent curing agent capable of curing the epoxy resin by heating may be mentioned, and examples thereof include a phenol-based curing agent, an amine compound-based curing agent, an acid anhydride-based curing agent, an amide compound-based curing agent, and a hydrazide compound-based curing agent.

The curing agent in this embodiment is preferably a phenol-based curing agent.

Examples of the phenol-based curing agent include a novolak-type phenol resin obtained by condensing or co-condensing a phenol compound, such as phenol, cresol, resorcin, catechol, bisphenol A, bisphenol F, phenylphenol and aminophenol, and/or a naphthol compound, such as α-naphthol, β-naphthol and dihydroxynaphthalene, with an aldehyde group-containing compound, such as formaldehyde, benzaldehyde and salicylaldehyde, under the presence of an acid catalyst; a phenol/aralkyl resin synthesized from a phenol compound and/or a naphthol compound with dimethoxyparaxylene or bis(methoxymethyl)biphenyl; an aralkyl-type phenol resin such as biphenylene phenol/aralkyl resin and naphthol/aralkyl resin; a dicyclopentadiene-type phenol novolak resin synthesized by copolymerization of a phenol compound and/or a naphthol compound with dicyclopentadiene; a dicyclopentadiene-type phenol resin such as dicyclopentadiene naphthol novolak resin; a triphenylmethane-type phenol resin; a terpene-modified phenol resin; a paraxylylene and/or methaxylylene-modified phenol resin; and a melamine-modified phenol resin.

In the phenol-based curing agent, the hydroxyl equivalent as measured in accordance with JIS K0070:1992 is, for example, preferably 70 g/eq or more, more preferably 80 g/eq or more, still more preferably 90 g/eq or more, yet still more preferably 100 g/eq or more.

The hydroxyl equivalent of the phenol-based curing agent is, for example, preferably 2,000 g/eq or less, more preferably 1,000 g/eq or less, still more preferably 500 g/eq or less.

The phenol-based curing agent is preferably a phenol novolak resin or a phenol-based curing agent represented by the following formula (2):

[Chem. 2]

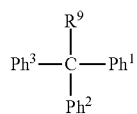

(2)

(in which "$R^9$" is any one of a hydroxyl group, a methyl group, an ethyl group, a propyl group and a hydrogen atom, "$Ph^1$", "$Ph^2$" and "$Ph^3$" may be the same as or different from one another and each is a unsubstituted or substituted phenyl represented by the following formula (3), and at least two of "$Ph^1$", "$Ph^2$" and "$Ph^3$" are a substituted phenyl having a hydroxyl group):

[Chem. 3]

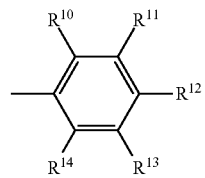

(3)

(in which each of "$R^{10}$" to "$R^{14}$" is independently any one of a hydroxyl group, a methyl group, an ethyl group, a propyl group and a hydrogen atom).

In the phenol-based curing agent described above, the number of hydroxyl groups in each phenyl ("$Ph^1$" to "$Ph^3$") is preferably 1 or 2.

In the phenol-based curing agent described above, each phenol preferably has no substituent other than a hydroxyl group (the members other than a hydroxyl group are preferably a hydrogen atom).

That is, the phenol-based curing agent in this embodiment is, for example, preferably 4,4',4"-methylidynetrisphenol represented by the following formula (4):

[Chem. 4]

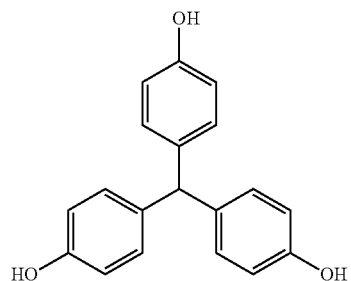

(4)

The curing agent as described above is preferably incorporated into the polymer composition, for example, in an amount of 0.1 parts by mass or more, preferably 1 part by mass or more, more preferably 10 parts by mass or more, per 100 parts by mass of the epoxy resin.

The curing agent is also preferably incorporated into the polymer composition, for example, in an amount of 500 parts by mass or less, preferably 300 parts by mass or less, more preferably 200 parts by mass or less, per 100 parts by mass of the epoxy resin.

In the case of employing a phenol-based curing agent as the curing agent, usually, the blending amount thereof is preferably adjusted such that the ratio ($N_G/N_{OH}$) between the number of hydroxyl groups ($N_{OH}$) of the phenol-based curing agent and the number of glycidyl groups ($N_G$) of the epoxy resin becomes from 0.5 to 2.0. The ratio is preferably 0.8 to 1.5, more preferably from 0.9 to 1.25.

In the polymer composition of this embodiment, one of the phenol-based curing agents above need not be used alone, but two or more phenol-based curing agents may be used in combination.

In the polymer composition of this embodiment, if necessary, a phenol-based curing agent and a curing agent except for a phenol-based curing agent (for example, an amine-based curing agent, an acid anhydride-based curing agent, a polymercaptan-based curing agent, a polyaminoamide-based curing agent, an isocyanate-based curing agent, or a block isocyanate-based curing agent) may be used in combination.

In the polymer composition of this embodiment, a curing accelerator may also be incorporated together with the curing agent.

Specifically, for example, a curing accelerator such as imidazole compound, imidazoline compound, organic phosphine compound, acid anhydride compound, amide compound, hydrazide compound and urea compound may be incorporated into the polymer composition of this embodiment.

The curing accelerator is preferably incorporated, for example, in an amount of 0.1 parts by mass or more, more preferably 0.5 parts by mass of more, still more preferably 1 part by mass or more, per 100 parts by mass of the epoxy resin.

In addition, the curing accelerator is preferably incorporated in an amount of 20 parts by mass or less, more preferably 10 parts by mass or less, still more preferably 5 parts by mass or less, per 100 parts by mass of the epoxy resin.

In the case of employing a phenol-based curing agent as the curing agent, an onium salt-based curing accelerator such as phosphonium salt-based curing accelerator and sulfonium salt-based curing accelerator is preferably employed as the curing accelerator to be incorporated into the polymer composition.

Many of the phenol-based curing agents described above have a softening point of more than 200° C. and therefore, the curing accelerator to be incorporated into the polymer composition preferably exhibits no excessive catalytic activity at a temperature of 200° C. or less.

For this reason, in the polymer composition of this embodiment, a phosphonium salt-based curing accelerator such as tetraphenylphosphonium salt-based curing accelerator and triphenylphosphonium salt-based curing accelerator is especially preferably incorporated as the onium salt-based curing accelerator, and it is most preferable to incorporate tetraphenylphosphonium tetraphenylborate.

In the polymer composition, an additive such as dispersant may be further incorporated so as to enhance the wettability of the thermal conductive inorganic particles to the polymer or suppress aggregation of the thermal conductive inorganic particles.

In the case of incorporating the dispersant above into the polymer composition, one dispersant may be used alone, or two or more dispersants may be used in combination.

The blending amount of the dispersant in the polymer composition is preferably 0.01 parts by mass or more, more preferably 0.1 parts by mass or more, per 100 parts by mass of the inorganic particles.

The blending amount of the dispersant is preferably 10 parts by mass or less, more preferably 5 parts by mass or less, per 100 parts by mass of the thermal conductive inorganic particles.

At the time of production of the polymer composition by mixing these components, it is preferable to sufficiently mix the thermal conductive inorganic particles with the epoxy resin, etc., thereby successfully dispersing the thermal conductive inorganic particles in the epoxy resin, etc.

The mixing may be performed, for example, by stirring or shaking the thermal conductive inorganic particles and the epoxy resin.

The stirring can be performed by a known method of applying a shear force to the thermal conductive inorganic particles and the epoxy resin and can be performed using a mill (e.g., ball mill, roll mill), a kneading machine (e.g., kneader, roll), a mortar, a planetary stirrer, etc.

In this embodiment, as well as stirring the thermal conductive inorganic particles and the epoxy resin, the stirring may be performed using a stirring/defoaming machine (e.g., hybrid mixer) so as to remove air bubbles from the polymer composition obtained.

The blending ratio of the thermal conductive inorganic particles at the time of production of the polymer composition is, for example, from 10 to 4,900 parts by mass, preferably from 100 to 2,400 parts by mass, more preferably from 300 to 1,500 parts by mass, especially preferably from 400 to 1,000 parts by mass, per 100 parts by mass of the electrically insulating polymer.

In other words, the polymer composition according to this embodiment is preferably produced by mixing the thermal conductive inorganic particles and the electrically insulating polymer such that the concentration of the inorganic particles of this embodiment in a thermal conductive molded article becomes, for example, from 9 to 98 mass %, preferably from 50 to 96 mass %, more preferably from 75 to 94 mass %, still more preferably from 80 to 91 mass %.

In order for the thermal conductive molded article to exhibit excellent thermal conductivity, it is important that the ratio of the first component to the total of the thermal conductive inorganic particles is 45 vol % or more.

The ratio of the first component to the thermal conductive inorganic particles is preferably 50 vol % or more, more preferably 60 vol % or more, still more preferably 70 vol % or more, yet still more preferably 80 vol % or more.

Furthermore, in order for the polymer composition to exhibit good fluidity, it is important that the ratio of the first component to the total of the thermal conductive inorganic particles is 95 vol % or less.

The ratio of the first component to the thermal conductive inorganic particles is preferably 90 vol % or less.

In other words, from the viewpoint of allowing the polymer composition to exhibit good fluidity and allowing the thermal conductive molded article to exhibit excellent thermal conductivity, it is important that the ratio of the second component to the total of the first component and the second component is set to the range of 5 to 55 vol %.

In order to more unfailingly exert the effects described above, the ratio of the second component to the total of the first component and the second component is preferably 10 vol % or more.

Furthermore, the ratio of the second component to the total of the first component and the second component is preferably 50 vol % or less, more preferably 40 vol % or less, still more preferably 30 vol % or less, yet still more preferably 20 vol % or less.

From the viewpoint of enhancing the handling property, a solvent may be incorporated into the polymer composition of this embodiment to form varnish.

Examples of the solvent include a hydroxyl group-containing aliphatic hydrocarbon such as alcohol (e.g., methanol, ethanol, propanol, isopropanol), a carbonyl group-containing aliphatic hydrocarbon such as ketone (e.g., acetone, methyl ethyl ketone, cyclohexanone, cyclopentanone), an aliphatic hydrocarbon (e.g., pentane, hexane), a halogenated aliphatic hydrocarbon (e.g., dichloromethane, chloroform, trichloroethane), a halogenated aromatic hydrocarbon (e.g., chlorobenzene, dichlorobenzene (specifically, ortho-dichlorobenzene)), an ether (e.g., tetrahydrofuran), an aromatic hydrocarbon (e.g., benzene, toluene, xylene), a nitrogen-containing compound (e.g., N-methylpyrrolidone (NMP), pyridine, acetonitrile, dimethylformamide (DMF)), and an aprotic solvent (e.g., dimethylsulfoxide (DMSO), dimethylformamide).

Other examples of the solvent include an alicyclic hydrocarbon (e.g., cyclopentane, cyclohexane), an ester (e.g., ethyl acetate), a polyol (e.g., ethylene glycol, glycerin), an acrylic monomer (e.g., isostearyl acrylate, lauryl acrylate, isoboronyl acrylate, butyl acrylate, methacrylate, acrylic acid, tetrahydrofurfuryl acrylate, 1,6-hexanediol diacrylate, 2-hydroxyethyl acrylate, 4-hydroxybutyl acrylate, phenoxyethyl acrylate, acryloylmorpholine), and a vinyl group-containing monomer (e.g., styrene, ethylene).

One of these solvents may be used alone, or two or more thereof may be used in combination.

The solvent is preferably any one of methyl ethyl ketone, toluene, cyclopentanone and ethyl acetate, or a mixed solvent obtained by mixing two or more kinds thereof.

The blending ratio of the solvent at the time of production of the polymer composition is, for example, from 30 to 1,900 parts by mass, preferably from 50 to 900 parts by mass, more preferably from 100 to 500 parts by mass, per 100 parts by mass of the electrically insulating polymer.

In the case where the electrically insulating polymer is liquid at normal temperature and normal pressure (20° C., 1 atm.) or where the electrically insulating polymer melts by heating, the solvent described above may not be incorporated into the polymer composition of this embodiment.

More specifically, when the electrically insulating polymer contained in the polymer composition exhibits by itself fluidity in an unheated state or heated state, good workability can be exhibited at the time of molding of the polymer composition into a thermal conductive molded article, and therefore, a solvent may not be incorporated.

The thermal conductive polymer composition according to this embodiment thus exhibits good fluidity to facilitate molding in various shapes and can be employed as a forming material for various thermal conductive molded articles.

The thermal conductive molded article and the production method thereof are described below by taking, as an example, a polymer sheet obtained by molding the polymer composition into a sheet shape.

Examples of the polymer sheet include a polymer sheet obtained by forming a polymer layer including the polymer composition on one surface or both surfaces of a substrate sheet, and a polymer sheet obtained by impregnating and supporting the polymer composition in a fibrous substrate sheet, in addition to a polymer sheet composed of the polymer composition, but in the following, a polymer sheet composed of the polymer composition is described mainly.

The polymer sheet of this embodiment is, as described above, a thermal conductive molded article obtained by molding the polymer composition into a sheet shape and is suitably used, for example, as a thermal conductive sheet interposed between a heat generating member causing heat generation and a thermal conductive member for dissipating heat of the heat generating member.

The thickness of the thermal conductive sheet is appropriately set according to uses and purposes thereof but is, for example, from 10 to 1,000 µm, preferably from 30 to 600 µm, more preferably from 50 to 400 µm, especially preferably from 100 to 300 µm.

In the case where the resin contained in the polymer composition is a thermoplastic resin, the thermal conductive sheet can be produced by carrying out, for example, the following steps (1a) to (1c):

(1a) a heating step of heating the polymer composition, for example, at 100 to 350° C. to enter a softened state in which the polymer composition exhibits easy deformability, (1b) a coating film-forming step of applying the polymer composition caused to enter a softened state in the heating step above onto an appropriate support plate to form a coating film, and (1c) a sheet forming step of cooling and thereby curing the coating film produced in the coating film-forming step above to obtain a thermal conductive sheet.

In the case where the resin contained in the resin composition is a thermosetting resin, the thermal conductive sheet can be produced by carrying out, for example, the following steps (2a) to (2c):

(2a) a heating step of heating the polymer composition to a temperature at which a curing reaction of the thermosetting resin does not excessively proceed and at which the polymer composition exhibits easy deformability (for example, from 60 to 150° C.), thereby causing the polymer composition to enter a softened state, (2b) a coating film-forming step of applying the polymer composition caused to enter a softened state in the heating step above onto an appropriate support plate to form a coating film, and (2c) a sheet forming step of cooling and thereby curing the coating film produced in the coating film-forming step above to obtain a thermal conductive sheet in which the thermosetting resin is in a semi-cured state (B-stage state).

In the case where the resin composition contains the solvent, the thermal conductive sheet can be produced by carrying out, for example, the following steps (3a) and (3b):

(3a) a coating film-forming step of applying the polymer composition onto an appropriate support plate to form a coating film in a wet state, and (3b) a sheet forming step of volatilizing and removing the solvent from the coating film formed in the coating film-forming step above to obtain a dry coating film working out to a thermal conductive sheet.

The coating film-forming step can be carried out, for example, by a known coating method such as spin coater method and bar coater method, and can be carried out by a manual application method using a known applicator.

At the time of the coating film-forming step, the viscosity of the polymer composition can be appropriately adjusted by using an evaporator, etc.

In the case where the polymer forming the dry coating film is a thermosetting resin, the dry coating film may be heated to adjust the curing degree or put the dry coating film into a completely cured (C-stage) state.

In particular, heating the dry coating film while applying a pressure in the thickness direction with a thermal pressing machine, etc. is advantageous in preventing an air bubble, etc. from being present in the thermal conductive sheet.

With respect to such an advantage, the same applies to the case where the polymer constituting the thermal conductive sheet is a thermoplastic resin.

In the case of additionally carrying out the thermal pressing step after the sheet forming step, the thermal pressing step can be carried out by a method where the once-produced thermal conductive sheet is continuously pressurized for about 10 minutes in a pressing machine heated to a preset temperature and then cooled while keeping on applying pressure.

In place of the method using an already-heated thermal pressing machine, the thermal pressing step may employ, for example, a method where the thermal conductive sheet is pressurized at normal temperature until reaching a preset pressure, then subjected to thermal pressing for a preset time by heating the thermal conductive sheet from the normal temperature to a preset temperature while keeping on applying pressure, and thereafter cooled to normal temperature while keeping on applying pressure.

By carrying out such a thermal pressing step, a thermal conductive sheet having a high thermal conductivity can be obtained, and in the case where the polymer contained is a thermosetting resin, a B-stage sheet or a C-stage sheet, having put into a desired cured state, can be obtained.

The heating temperature in the thermal pressing step is, for example, 60° C. or more.

The heating temperature is preferably from 80 to 250° C., more preferably from 90 to 220° C., still more preferably from 100 to 200° C.

In the case of obtaining the B-stage sheet, since it is preferable not to excessively heat the thermal conductive sheet, the heating temperature in the thermal pressing step is, within the temperature range of 60° C. or more, for example, preferably from 70 to 160° C., more preferably from 80 to 150° C.

In the case of obtaining the C-stage sheet, for allowing the curing to sufficiently proceed, the heating temperature is preferably 120° C. or more, more preferably from 130 to 250° C., especially preferably from 150 to 220° C.

In the case of obtaining the B-stage sheet, the heating time in the thermal pressing step is preferably 5 minutes or more, more preferably from 7 to 30 minutes, especially preferably from 10 to 20 minutes.

The heating time when obtaining the C-stage sheet is preferably 10 minutes or more, more preferably 30 minutes or more, especially preferably one hour or more.

Such a thermal pressing step may also be carried out under a vacuum condition.

In place of the above-described method, it is also possible to form the thermal conductive sheet by using an extrusion molding machine equipped with a flat die (T-die), etc.

In the polymer composition or thermal conductive molded article of this embodiment, the inorganic particles include two components (first component, second component) each having a predetermined specific surface area.

Accordingly, the polymer composition exhibits excellent fluidity in the coating film-forming step, etc., and a void is less likely to be formed in the inside even without applying a high pressure in the thermal pressing step, etc., so that thermal conductivity can be excellent and a high partial discharge inception voltage and excellent mechanical strength can be achieved.

The thermal conductive sheet that is the thermal conductive molded article in a sheet shape has the above-described advantages and therefore, is suitably used, for example, as a thermal conductive sheet provided between CPU and fins or as a thermal conductive sheet of a power card utilized in an inverter, etc. of an electric vehicle.

The thermal conductive molded article of this embodiment can also be obtained by a molding machine other than those described above.

For example, the thermal conductive molded article of this embodiment can be molded as a thermal conductive block by putting the polymer composition in a die and carrying out thermoforming such as thermal pressing.

Furthermore, the thermal conductive molded article according to this embodiment may be configured to have a three-dimensional structure by in-mold forming such as transfer molding and injection molding.

In this in-mold forming, for example, in the case of forming only part of the thermal conductive molded article from the polymer composition of this embodiment and forming the remainder from a material other than the polymer composition, it is also possible to employ a method where the remainder is previously formed from the other material and after placing the member formed of the other material in a molding die, the polymer composition is filled into the die.

In the thermal conductive molded article of this embodiment, the porosity of a portion formed of the thermal conductive polymer composition is preferably 3% or less.

The porosity of the portion is more preferably 2.5% or less, still more preferably 2.0% or less, yet still more preferably 1.5% or less, even yet still more preferably 1.0% or less.

The lower limit value of the porosity of the portion is usually 0%.

Although the detailed description is not repeated here any more, the polymer composition and the thermal conductive molded article of this embodiment are not limited to the matters exemplified above, and appropriate changes can be added to those matters exemplified.

EXAMPLES

The present invention is described in greater detail below by referring to Examples, but the present invention is not limited thereto.

<Preparation of Epoxy Composition>

The following materials were provided so as to prepare an epoxy composition for evaluation.

(Epoxy Resin: Ep1)

An epoxy resin having an epoxy equivalent of 169 g/eq manufactured by Nippon Kayaku Co., Ltd. (trade name: "EPPN-501HY"), which is a substance represented by the following formula (5):

[Chem. 5]

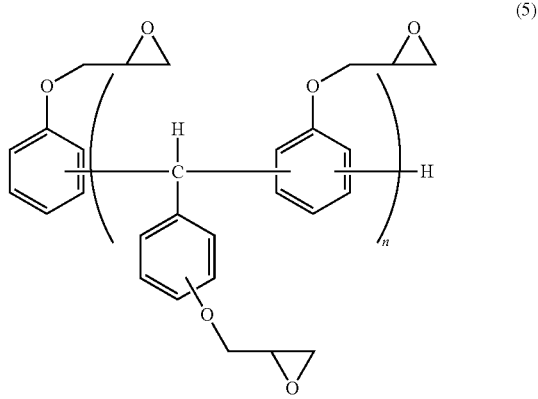

(in which "n" represents a number of 1 to 3).

(Epoxy Resin: Ep2)

An epoxy resin having an epoxy equivalent of 192 g/eq manufactured by Mitsubishi Chemical Corporation (trade name: "YX4000HK"), which is a substance represented by the following formula (6):

[Chem. 6]

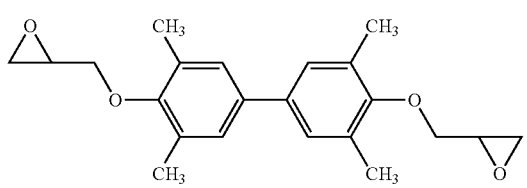

(6)

(Epoxy Resin: Ep3)

An epoxy resin having an epoxy equivalent of 175 g/eq manufactured by Mitsubishi Chemical Corporation (trade name: "YL6121H"), which is a mixture of a substance represented by formula (6) described above and a substance represented by the following formula (7):

[Chem. 7]

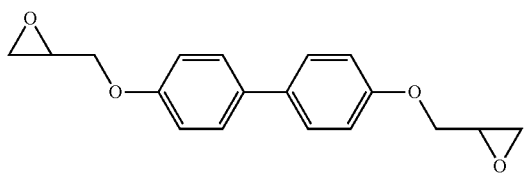

(7)

(Phenol-Based Curing Agent: C1)

A substance having a hydroxyl equivalent of 105 g/eq manufactured by Gun Ei Chemical Industry Co., Ltd. (trade name: "GS-200"), represented by the following formula (8):

[Chem. 8]

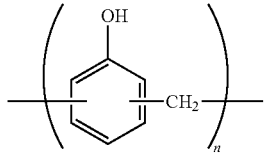

(8)

(Phenol-Based Curing Agent: C2)

4,4',4''-Methylidynetrisphenol having a hydroxyl equivalent of 97 g/eq manufactured by Wako Pure Chemical Industries, Ltd., represented by the following formula (4):

[Chem. 9]

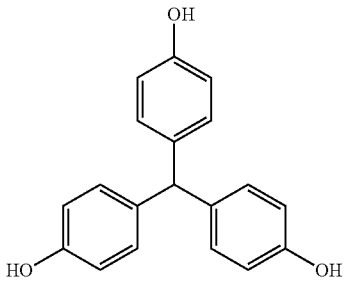

(4)

(Phenol-Based Curing Agent: C3)

A substance having a hydroxyl equivalent of 138 g/eq manufactured by Honshu Chemical Industry Co., Ltd. (trade name: "DHTP-M"), represented by the following formula (9):

[Chem. 10]

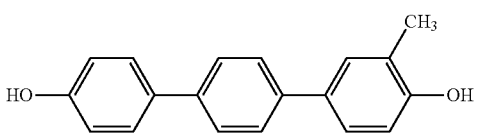

(9)

(Curing Accelerator: CA)

Tetraphenylphosphonium tetraphenylborate (TPPK)

(Dispersant: D1)

Dispersant manufactured by BYK Japan K.K., trade name: "DISPER BYK-111"

(Dispersant: D2)

Phenyltrimethoxysilane manufactured by Shin-Etsu Chemical Co., Ltd., trade name: "KBM-103"

(Additive: A1)

Pigment manufactured by TOYOCOLOR Co., Ltd., trade name: "TY90230GREY"

(Boron Nitride Particles in Aggregated State: F1)

Aggregated boron nitride particles manufactured by Mizushima Ferroalloy Co., Ltd., trade name: "HP-40" (specific surface area: 3 m$^2$/g)

(Other Inorganic Particles: F2 to F13)

F2: Aggregated aluminum nitride particles manufactured by Furukawa Denshi Co., Ltd., trade name: "FAN-f80" (specific surface area: from 0.1 to 0.15 m$^2$/g)

F3: Aggregated aluminum nitride particles manufactured by Furukawa Denshi Co., Ltd., trade name: "FAN-f50" (specific surface area: 0.15 m$^2$/g)

F4: Aggregated aluminum nitride particles manufactured by Furukawa Denshi Co., Ltd., trade name: "FAN-f30" (specific surface area: 0.2 m$^2$/g)

F5: Aggregated aluminum nitride particles manufactured by Globaltop Materals, trade name: "AlN200AF" (specific surface area: 0.12 m$^2$/g)

F6: Aggregated aluminum nitride particles manufactured by Furukawa Denshi Co., Ltd., trade name: "FAN-f05" (specific surface area: 1 m$^2$/g)

F7: Spherical aluminum oxide particles manufactured by Showa Denko K.K., trade name: "CB-A40" (specific surface area: 0.2 m$^2$/g)

F8: Spherical aluminum oxide particles manufactured by Showa Denko K.K., trade name: "CB-P10" (specific surface area: 0.6 m$^2$/g)

F9: Spherical aluminum oxide particles manufactured by Showa Denko K.K., trade name: "CB-P02" (specific surface area: 1.1 m²/g)

F10: Non-aggregated aluminum nitride particles (primary particles) manufactured by Mitsui Chemicals, Inc., trade name: "MBN-010T" (specific surface area: 13 m²/g)

F11: Diamond particles

F12: Ultrafine pyrogenic silica particles manufactured by Nippon Aerosil Co., Ltd., trade name: "AEROSIL"

F13: Nano-silica particles manufactured by Admatechs Company Limited, trade name: "ADMANANO YA010C-SV1"

<Production of Varnish>

The formulation of an epoxy resin composition for producing a thermal conductive sheet is shown in Tables 2 to 4 later.

A varnish-like epoxy resin composition was produced according to the blending amounts shown in Tables 2 to 4.

First, an epoxy resin (Ep1-Ep3) and a phenol-based curing agent (C1-C3) were charged into a vessel for exclusive use with a hybrid mixer.

Next, as the solvent shown in the Tables, methyl ethyl ketone was charged into the vessel.

Here, in the case of using "ADMANANO YA010C-SV1" (F13), this was dispersed at a concentration of 3 mass % in cyclopentanone in place of methyl ethyl ketone as the solvent, and the resulting dispersion liquid was charged into the vessel.

At this time, the vessel into which the epoxy resin and the solvent were charged was, if desired, warmed with hot water at 70° C.

For dissolving the epoxy resin, etc., the vessel was set in a hybrid mixer and subjected to stirring.

The stirring time here was fundamentally set to 10 minutes and appropriately extended according to the degree of dissolution of the resin to produce a resin solution.

Subsequently, a predetermined amount of additive was added to the resin solution, and the solution was stirred for 3 minutes in the hybrid mixer.

Furthermore, a predetermined amount of TPPK (CA) was added to the resin solution, and the solution was stirred for 3 minutes in the hybrid mixer.

Thereafter, the inorganic particles (F2-F13) other than the boron nitride particles in an aggregated state were added to the resin solution, and the solution was stirred for 5 minutes in the hybrid mixer. After further adding boron nitride particles (F1), stirring for one minute in the hybrid mixer was carried out.

When stirring after adding the boron nitride particles in an aggregated state was completed, the viscosity of the admixture in the vessel was confirmed and if desired, while adding the solvent, additional stirring (one minute) was carried out.

Through these steps, a varnish-like epoxy resin composition was obtained, and the epoxy resin composition was subjected to a vacuum defoaming treatment for 3 minutes and used as a coating solution for the production of a thermal conductive sheet.

In Examples 13 to 16, the defoaming step was omitted.

<Production of Thermal Conductive Sheet>

First, dust was removed from the surface of a coating table (glass plate), and a mat PET (PET) was disposed on the coating table with the roughened surface up and fixed.

Next, the coating solution above was manually applied by using an applicator with a thickness of 300 μm to 400 μm to form a wet coating film on the mat PET.

The mat PET having formed thereon the wet coating film was placed on an SUS-made plate and dried for 10 minutes in a dryer at 110° C.

In the case of using cyclopentanone as the solvent, drying of 130° C.×10 minutes was performed, in place of the above-described conditions.

<Production of B-Stage Sheet>

The mat PET having thereon a dry coating film formed by the drying above was cut out into a predetermined size (for example, 50 mm×50 mm) to prepare a sheet sample for thermal pressing, and a required number of sheets of the sheet sample were produced.

Subsequently, as illustrated in FIG. 3, two sheets of the sheet sample (SP) were laminated so as to arrange dry coating films (S1) on the inner side to produce a laminate (mat PET (S2)/dry coating film (S1)/dry coating film (S1)/mat PET (S2)).

Using this laminate, a press set for carrying out a thermal pressing step was formed.

At the time of forming the press set, mat PET (MP)/laminate/mat PET (MP) were stacked in order from the bottom to form a primary set (L1).

The primary set (L1) was sandwiched on both sides with aluminum plates (AP) and put between top plates (EP) via one sheet of mat PET (MP) and a cushioning sheet (CS) composed of 15 sheets of cushion paper to form a press set.

The laminate structure of the press set was, in the case of one-tier primary set (L1), top plate (aluminum plate)/cushioning sheet/mat PET/aluminum plate (AP)/primary set (L1)/aluminum plate (AP)/mat PET/cushioning sheet/top plate (aluminum plate) in order from the bottom (see, FIG. 1(a)).

Figure 1B:
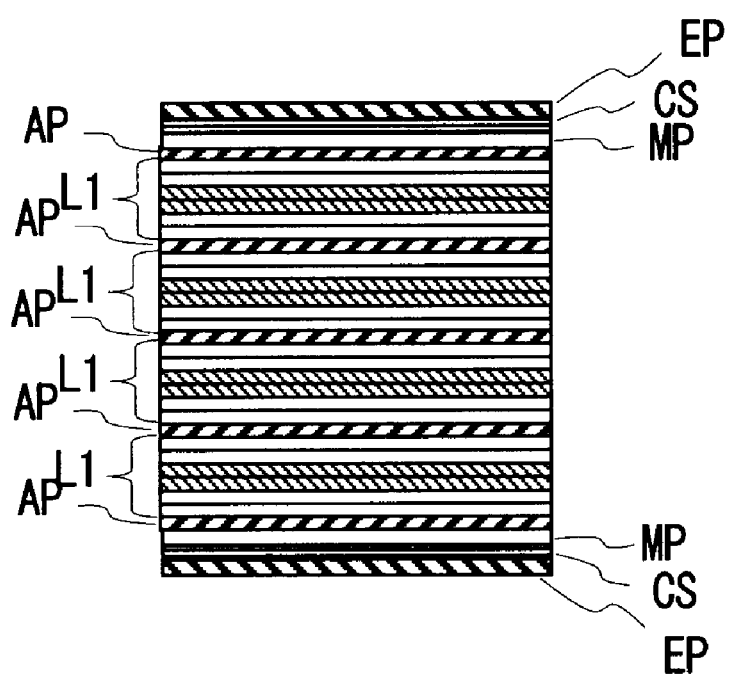

The press set was formed, if desired, by alternately stacking an aluminum plate (AP) and a primary set (L1) in two to four tiers (in the case of four tiers, see FIG. 1(B)).

The press set was set in a vacuum pressing machine and pressurized to a predetermined pressure at a normal temperature in a vacuum state.

Subsequently, by setting the pressing temperature to 120° C., the press set described above was pressed for 20 minutes inclusive of the temperature rise time to adhere dry coating films to each other and then cooled to normal temperature while keeping the pressurized state, and the mat PETs were removed to obtain a sheet sample in B-stage state (B-stage sheet having a two-layer structure).

In Examples 13 to 15, two sheets of this B-stage sheet having a two-layer structure were thermally pressed in the same manner as described above to produce a B-stage sheet having a four-layer structure.

In addition, in Examples 13 and 16, the pressing temperature was set to 130° C. instead of 120° C.

<Production of C-Stage Sheet>

The same press set as the press set prepared at the time of production of a B-stage sheet was prepared except for using two sheets of the B-stage sheet in place of two sheets of the sheet sample cut out from the mat PET having formed thereon a dry coating film, and this press set was placed on a pressing plate heated at normal pressure and pressurized to a predetermined pressure under vacuum.

Subsequently, by setting the pressing temperature to 180° C., the press set described above was pressed for 60 minutes inclusive of the temperature rise time to adhere B-stage sheets to each other and then cooled to normal temperature while keeping the pressurized state, to obtain a sheet sample in C-stage state having a thickness of about 400 μm.

The sheet sample was pressed at the pressing temperature for 10 minutes and then cooled to normal temperature to produce a C-stage sheet.

(Evaluation Method)

<Measurement of Particle Diameter/Shape>

With respect to the inorganic particles used for the production of the C-stage sheet, the particle diameter, the particle size distribution and the particle shape were confirmed as follows.

(1) Laser Diffraction/Scattering Method

About 50 mg of inorganic particles were dispersed in 1 cc of a measurement solvent, and the dispersion was subjected to an ultrasonic treatment for 10 minutes to prepare a particle dispersion liquid for particle size distribution measurement.

A diluting solvent was put in a vessel for particle size distribution measurement, and an appropriate amount of the particle dispersion liquid above was further put in the vessel for measurement. After stirring, the particle size distribution was measured using "SALD-2100" manufactured by Shimadzu Corporation.

(2) Image Analysis Method

First, a predetermined amount of particles of 1 to 19 mm$^3$ were dispersed and fixed on a glass plate by using a compressive air.

Next, an optical image of particles fixed in an area of 5 to 20 mm square was obtained using a particle image analyzer, "Morphologi G3", manufactured by Malvern Instruments Ltd.

From the obtained image of 50,000 or more particles, the area/circularity (HS) and the volume average particle diameter (D) of the inorganic particles were determined through a filter treatment performed using a parameter "solidity=0.91".

The results are shown together with the specific area (SA) in the Tables.

<Evaluation of Porosity>

The percentage of voids (porosity) contained in the C-stage sheet was evaluated.

The porosity ($\phi$) was calculated from the theoretical density ($\rho_T$) and the measured density ($\rho_E$) according to the following formula (a):

$$\text{Porosity } (\phi) = (1 - \rho_E/\rho_T) \times 100(\%) \quad (a)$$

The measured density ($\rho_E$) was determined using a density measuring apparatus manufactured by METLER TOLEDO.

More specifically, the measured density ($\rho_E$) was obtained using the C-stage sheet of about 20 mm square by an in-water substitution method with water at 25° C. in accordance with JIS K7112:1999.

The theoretical density ($\rho_T$) was calculated assuming that the density of boron nitride particle is 2.26 g/cm$^3$, the density of aluminum nitride is 3.26 g/cm$^3$, the density of aluminum oxide is 3.8 g/cm$^3$, and the density of resin, etc. is 1.3 g/cm$^3$.

For example, on the assumption that 100 g of a polymer composition containing 85.3 mass % of aluminum nitride particles is constituted only by an aluminum nitride particles having a volume of 26.2 cm$^3$ (85.3/3.26) and a polymer having a volume of 11.3 cm$^3$ (14.7/1.3), the theoretical density was calculated to be about 2.66 g/cm$^3$ (100/(26.2+11.3)).

In Tables 5 to 7, the results from judging the porosity as follows are shown.

"C": In the case where the porosity was 3.0% or more under all pressing conditions of a pressure of 2 to 10 MPa.

"A": In the case where the porosity was less than 3.0% under any one pressing condition of a pressure of 2 to 10 MPa.

<Evaluation of Thermal Conductivity>

A square test piece with one side being 1 cm and a circular test piece with a diameter of 2.5 cm were cut out from the C-stage sheet produced as above, and FC-153 Black Guard Spray as an antireflection agent for laser processing was thinly applied (dry thickness: 10 μm or less) as a blackening treatment onto each of the light-receiving part and the detection part. The square test piece was used as a sample for thermal diffusivity measurement in the thickness direction, and the circular test piece was used as a sample for thermal diffusivity measurement in the plane direction.

The thermal diffusivities in the thickness direction and the plane direction of the C-stage sheet were measured using xenon flash under the evaluation conditions shown below, and the thermal conductivity was determined by multiplying the obtained thermal diffusivity by the theoretical density calculated above and a theoretical specific heat.

TABLE 1

(Xenon Flash Conditions)

| | Thickness Direction |
|---|---|
| Pulse width | Medium |
| Output power of light source | 224 V |
| Analysis model (single layer model) | Cowan + pulse collection |
| Optical filter | 100% |
| Auto Adjust | used |
| Measurement temperature | 25° C. |

The theoretical specific heat of the polymer composition was calculated assuming that the specific heat of boron nitride particle is 0.78 kJ/kgK, the specific heat of aluminum nitride particle is 0.74 kJ/kgK, the specific heat of aluminum oxide particle is 0.75 kJ/kgK, and the specific heat of epoxy resin, etc. is 1.5 kJ/kgK.

For example, the theoretical specific heat of a polymer containing 85.3 mass % of aluminum nitride particles was calculated to be about 0.85 kJ/kgK (0.853×0.74+0.147×1.5).

In Tables 5 to 7, the results from judging the thermal conductivity as follows are shown.

"C": In the case where the thermal conductivity was less than 12.5 W/mK under all pressing conditions of a pressure of 2 to 10 MPa.

"A": In the case where the thermal conductivity was 12.5 W/mK or more under any one pressing condition of a pressure of 2 to 10 MPa.

Furthermore, in the Tables, the results from judging the porosity and the thermal conductivity under each pressing condition according to the following criteria are shown.

"C": In the case where the porosity was 3% or more or the thermal conductivity was less than 12.5 W/mK.

"A": In the case where the porosity was less than 3% and the thermal conductivity was 12.5 W/mK or more.

"AA": In the case where the porosity was less than 2% and the thermal conductivity was 13.0 W/mK or more.

In the Tables, the results of overall judgment according to the following criteria, based on judgment results under respective pressing conditions, are shown.

"C": In the case where the judgment results under all pressing conditions were "C".

"A": In the case where, under any one pressing condition, "A" was given but "AA" was not given.

"AA": In the case where, under any one pressing condition, "AA" was given.

TABLE 2

| SA | HS | D | Density | Blending (g) | | Example 1 | 2 | 3 | 4 | 5 | 6 | 7 | 8 | 9 | 10 |
|---|---|---|---|---|---|---|---|---|---|---|---|---|---|---|---|
| | | | 1.3 | Epoxy | Ep1 | 10.45 | 10.99 | 12.35 | 14.04 | 9.92 | 11.91 | 11.03 | 10.99 | 11.03 | 10.96 |
| | | | | | Ep2 | | | | | | | | | | |
| | | | | | Ep3 | | | | | | | | | | |
| | | | 1.3 | Curing agent | C1 | 6.49 | 6.83 | 7.67 | 8.73 | 6.17 | 7.4 | 6.85 | 6.83 | 6.85 | 6.81 |
| | | | | | C2 | | | | | | | | | | |
| | | | | | C3 | | | | | | | | | | |
| | | | 1.3 | Curing accelerator | CA | 0.104 | 0.11 | 0.123 | 0.14 | 0.099 | 0.119 | 0.11 | 0.11 | 0.11 | 0.11 |
| | | | | Subtotal | | 17.04 | 17.93 | 20.14 | 22.91 | 16.19 | 19.43 | 17.99 | 17.93 | 17.99 | 17.88 |
| | | | | Solvent | | MEK | MEK | MEK | MEK | MEK | MEK | MEK | MEK | MEK | MEK |
| | | | 1.3 | Additive | A1 | 1.053 | 1.16 | 1.361 | 1.618 | 1 | 1.2 | 1.111 | 1.16 | 1.111 | 1.187 |
| | | | 1.3 | Dispersant | D1 | | | | | | | | | | |
| | | | | | D2 | | | | | | | | | | |
| 3 | 0.74 | 31 | 2.26 | BN (A) | F1 | 50 | 50 | 50 | 50 | 30 | 30 | 50 | 50 | 50 | 50 |
| 0.1-0.15 | 0.64 | 88 | 3.26 | AlN | F2 | | | | | | | 8 | | | |
| 0.15 | 0.63 | 75 | 3.26 | AlN | F3 | 3.8 | 8 | 18 | 30.9 | 28.83 | 43.3 | | | | |
| 0.2 | 0.7 | 31 | 3.26 | AlN | F4 | | | | | | | | 8 | | |
| 0.12 | 0.74 | 25 | 3.26 | AlN | F5 | | | | | | | | | 8 | |
| 1 | 0.81 | 5.9 | 3.26 | AlN | F6 | | | | | | | | | | |
| 0.2 | 0.78 | 33 | 3.8 | Al₂O₃ | F7 | | | | | | | | | | 9.3 |
| 0.6 | 0.9 | 9.7 | 3.8 | Al₂O₃ | F8 | | | | | | | | | | |
| 1.1 | 0.85 | 7 | 3.8 | Al₂O₃ | F9 | | | | | | | | | | |
| 13 | 0.8 | 5.5 | 2.26 | BN (NA) | F10 | | | | | | | | | | |
| | 0.78 | 51 | 3.51 | Diamond | F11 | | | | | | | | | | |
| 300 | | 14.4 | 2.1.5 | AEROSIL | F12 | | | | | | | | | | |
| 300 | | | 0.05 | 2.15 | nano-silica | F13 | | | | | | | | | |
| | | | | Total amount of solid matters (g) | | 72.8 | 78 | 90.6 | 106.6 | 76.8 | 94.9 | 78 | 78 | 78 | 79.3 |
| | | | | Inorganic particle content percentage (wt %) | | 75.1 | 75.5 | 76.3 | 77 | 77.6 | 78.3 | 75.5 | 75.5 | 75.5 | 76 |
| | | | | Inorganic particle content percentage (vol %) | | 63 | 63 | 63 | 63 | 63 | 63 | 63 | 63 | 63 | 63 |
| | | | | Theoretical specific heat (kJ/kg · K) | | 0.96 | 0.95 | 0.94 | 0.93 | 0.93 | 0.92 | 0.95 | 0.95 | 0.95 | 0.95 |
| | | | | Theoretical density (g/cm³) | | 1.93 | 1.97 | 2.03 | 2.09 | 2.15 | 2.21 | 1.97 | 1.97 | 1.98 | 2 |
| Proportion of second component in inorganic particles | | | | (F2 to F13)/(F1 to F13) (wt %) | | 8.6 | 15.2 | 27.6 | 39.1 | 49.7 | 59.6 | 15.2 | 15.2 | 15.2 | 17 |
| | | | | (F2 to F13)/(F1 to F13) (vol %) | | 6.7 | 11.6 | 21.4 | 31.2 | 41 | 50.9 | 11.6 | 11.6 | 11.6 | 11.6 |
| Particle size distribution of inorganic particles (first component + second component) | | | | Proportion of particles of 10 μm or more (vol %) | | 84.3 | 85 | 86.5 | 88 | 89.5 | 90.9 | 85.1 | 85.1 | 84 | 85 |
| | | | | Proportion of particles of 20 μm or more (vol %) | | 64.2 | 65.9 | 69.7 | 72.6 | 75.9 | 79.2 | 66 | 64.9 | 62.3 | 65.3 |
| | | | | Proportion of particles of 30 μm or more (vol %) | | 53.3 | 55.4 | 59.5 | 63.7 | 67.9 | 72 | 55.5 | 51.5 | 50 | 52.1 |
| | | | | Proportion of particles of 200 μm or more (vol %) | | 0 | 0 | 0 | 0 | 0 | 0 | 0 | 0 | 0 | 0 |

TABLE 3

| SA | HS | D | Density | Blending (g) | | Example 11 | 12 | 13 | 14 | 15 | 16 | 17 |
|---|---|---|---|---|---|---|---|---|---|---|---|---|
| | | | 1.3 | Epoxy | Ep1 | 12.22 | 12.14 | | | | | 10.99 |
| | | | | | Ep2 | | | 3.18 | 3.63 | | | |
| | | | | | Ep3 | | | | | 3.51 | 3.06 | |
| | | | 1.3 | Curing agent | C1 | 7.609 | 7.54 | | | | | 6.83 |
| | | | | | C2 | | | | 1.83 | 1.95 | | |
| | | | | | C3 | | | 2.29 | | | 2.41 | |
| | | | 1.3 | Curing accelerator | CA | 0.122 | 0.121 | 0.032 | 0.036 | 0.035 | 0.031 | 0.11 |
| | | | | Subtotal | | 19.94 | 19.8 | 5.5 | 5.5 | 5.5 | 5.5 | 17.93 |
| | | | | Solvent | | MEK | MEK | cyclopentanone | cyclopentanone | cyclopentanone | cyclopentanone | MEK |
| | | | 1.3 | Additive | A1 | 1.361 | 1.361 | | | | | 1.173 |
| | | | 1.3 | Dispersant | D1 | 0.207 | 0.345 | | | | | |
| | | | | | D2 | | | 0.27 | 0.27 | 0.27 | 0.27 | |
| 3 | 0.74 | 31 | 2.26 | BN (A) | F1 | 50 | 50 | 13.4 | 13.4 | 13.4 | 13.4 | 50 |
| 0.1-0.15 | 0.64 | 88 | 3.26 | AlN | F2 | | | | | | | |
| 0.15 | 0.63 | 75 | 3.26 | AlN | F3 | 18 | 18 | 4.84 | 4.84 | 4.84 | 4.84 | |
| 0.2 | 0.7 | 31 | 3.26 | AlN | F4 | | | | | | | |
| 0.12 | 0.74 | 25 | 3.26 | AlN | F5 | | | | | | | |

TABLE 3-continued

|  |  |  |  |  |  | Example | | | | | | |
|---|---|---|---|---|---|---|---|---|---|---|---|---|
| SA | HS | D | Density | Blending (g) | | 11 | 12 | 13 | 14 | 15 | 16 | 17 |
| 1 | 0.81 | 5.9 | 3.26 | AlN | F6 | | | | | | | |
| 0.2 | 0.78 | 33 | 3.8 | Al$_2$O$_3$ | F7 | | | | | | | |
| 0.6 | 0.9 | 9.7 | 3.8 | Al$_2$O$_3$ | F8 | | | | | | | |
| 1.1 | 0.85 | 7 | 3.8 | Al$_2$O$_3$ | F9 | | | | | | | |
| 13 | 0.8 | 5.5 | 2.26 | BN (NA) | F10 | | | | | | | |
|  | 0.78 | 51 | 3.51 | Diamond | F11 | | | | | | | 8.6 |
| 300 |  | 14.4 | 2.15 | AEROSIL | F12 | 1.04 | 1.03 | | | | | |
| 300 |  | 0.05 | 2.15 | nano-silica | F13 | | | 0.29 | 0.29 | 0.29 | 0.29 | |
| Total amount of solid matters (g) | | | | | | 90.6 | 90.5 | 24.3 | 24.3 | 24.3 | 24.3 | 78.6 |
| Inorganic particle content percentage (wt %) | | | | | | 76.3 | 76.3 | 76.3 | 76.3 | 76.3 | 76.3 | 75.7 |
| Inorganic particle content percentage (vol %) | | | | | | 63 | 63 | 63 | 63 | 63 | 63 | 63 |
| Theoretical specific heat (kJ/kg · K) | | | | | | 0.94 | 0.94 | 0.94 | 0.94 | 0.94 | 0.94 | 0.93 |
| Theoretical density (g/cm$^3$) | | | | | | 2.03 | 2.03 | 2.03 | 2.03 | 2.03 | 2.03 | 1.98 |
| Proportion of second component in inorganic particles | (F2 to F13)/(F1 to F13) (wt %) | | | | | 27.6 | 27.6 | 27.6 | 27.6 | 27.6 | 27.6 | 16.1 |
| | (F2 to F13)/(F1 to F13) (vol %) | | | | | 21.4 | 21.4 | 21.4 | 21.4 | 21.4 | 21.4 | 11.6 |
| Particle size distribution of inorganic particles (first component + second component) | Proportion of particles of 10 μm or more (vol %) | | | | | 86.5 | 86.5 | 85.3 | 85.3 | 85.3 | 85.3 | 85.1 |
| | Proportion of particles of 20 μm or more (vol %) | | | | | 69.3 | 69.3 | 68.8 | 68.8 | 68.8 | 68.8 | 66.1 |
| | Proportion of particles of 30 μm or more (vol %) | | | | | 59.5 | 59.5 | 59.3 | 59.3 | 59.3 | 59.3 | 55.8 |
| | Proportion of particles of 200 μm or more (vol %) | | | | | 0 | 0 | 0 | 0 | 0 | 0 | 0 |

TABLE 4

|  |  |  |  |  |  | Comparative Example | | | | | | |
|---|---|---|---|---|---|---|---|---|---|---|---|---|
| SA | HS | D | Density | Blending (g) | | 1 | 2 | 3 | 4 | 5 | 6 | 7 |
|  |  |  | 1.3 | Epoxy | Ep1 | 9.92 | 14.89 | 19.85 | 11.03 | 11.03 | 11.03 | 11.01 |
|  |  |  |  |  | Ep2 | | | | | | | |
|  |  |  |  |  | Ep3 | | | | | | | |
|  |  |  | 1.3 | Curing agent | C1 | 6.17 | 9.25 | 12.33 | 6.85 | 6.85 | 6.85 | 6.84 |
|  |  |  |  |  | C2 | | | | | | | |
|  |  |  |  |  | C3 | | | | | | | |
|  |  |  | 1.3 | Curing accelerator | CA | 0.099 | 0.149 | 198 | 0.11 | 0.11 | 0.11 | 0.11 |
|  |  |  |  | Subtotal | | 16.19 | 24.29 | 32.38 | 17.99 | 17.99 | 17.99 | 17.96 |
|  |  |  |  | Solvent | | MEK | MEK | MEK | MEK | MEK | MEK | MEK |
|  |  |  | 1.3 | Additive | A1 | 1 | 1.5 | 2 | 1.11 | 1.11 | 1.111 | 1.11 |
|  |  |  | 1.3 | Dispersant | D1 | | | | | | | |
|  |  |  |  |  | D2 | | | 0.27 | 0.27 | 0.27 | 0.27 | |
| 3 | 0.74 | 31 | 2.26 | BN (A) | F1 | 50 | 50 | 30 | 50 | 50 | 50 | 50 |
| 0.1-0.15 | 0.64 | 88 | 3.26 | AlN | F2 | | | | | | | |
| 0.15 | 0.63 | 75 | 3.26 | AlN | F3 | | 64.9 | 101 | | | | |
| 0.2 | 0.7 | 31 | 3.26 | AlN | F4 | | | | | | | |
| 0.12 | 0.74 | 25 | 3.26 | AlN | F5 | | | | | | | |
| 1 | 0.81 | 5.9 | 3.26 | AlN | F6 | | | | | 8 | | |
| 0.2 | 0.78 | 33 | 3.8 | Al$_2$O$_3$ | F7 | | | | | | | |
| 0.6 | 0.9 | 9.7 | 3.8 | Al$_2$O$_3$ | F8 | | | | | 9.3 | | |
| 1.1 | 0.85 | 7 | 3.8 | Al$_2$O$_3$ | F9 | | | | | | 9.3 | |
| 13 | 0.8 | 5.5 | 2.26 | BN (NA) | F10 | | | | | | | 5.6 |
|  | 0.78 | 51 | 3.51 | Diamond | F11 | | | | | | | |
| 300 |  | 14.4 | 2.15 | AEROSIL | F12 | 0.84 | 1.27 | 1.69 | 0.94 | 0.94 | 0.94 | 0.94 |
| 300 |  | 0.05 | 2.15 | nano-silica | F13 | | | | | | | |
| Total amount of solid matters (g) | | | | | | 68 | 122 | 167.1 | 78 | 79.3 | 79.3 | 75.6 |
| Inorganic particle content percentage (wt %) | | | | | | 74.7 | 78.9 | 79.4 | 75.5 | 75.9 | 75.9 | 74.8 |
| Inorganic particle content percentage (vol %) | | | | | | 63 | 63 | 63 | 63 | 63 | 63 | 63 |
| Theoretical specific heat (kJ/kg · K) | | | | | | 0.96 | 0.91 | 0.9 | 0.95 | 0.95 | 0.95 | 0.96 |
| Theoretical density (g/cm$^3$) | | | | | | 1.9 | 2.28 | 2.34 | 1.97 | 2 | 2 | 1.9 |
| Proportion of second component in inorganic particles | (F2 to F13)/(F1 to F13) (wt %) | | | | | 1.7 | 68.8 | 77.4 | 15.2 | 17.1 | 17.1 | 11.5 |
| | (F2 to F13)/(F1 to F13) (vol %) | | | | | 1.7 | 60.7 | 70.5 | 11.6. | 11.6 | 11.6 | 11.6 |

TABLE 4-continued

| SA | HS | D | Density | Blending (g) | Comparative Example | | | | | | |
|---|---|---|---|---|---|---|---|---|---|---|---|
| | | | | | 1 | 2 | 3 | 4 | 5 | 6 | 7 |
| Particle size distribution of inorganic particles (first component + second component) | | | Proportion of particles of 10 μm or more (vol %) | | 83.6 | 92.4 | 93.9 | 76.7 | 80.1 | 77.3 | 76 |
| | | | Proportion of particles of 20 μm or more (vol %) | | 62.6 | 82.6 | 85.9 | 57 | 57.2 | 56.4 | 56.5 |
| | | | Proportion of particles of 30 μm or more (vol %) | | 51.2 | 76.7 | 80.4 | 46.3 | 46.1 | 46.1 | 46.1 |
| | | | Proportion of particles of 200 μm or more (vol %) | | 0 | 0 | 0 | 0 | 0 | 0 | 0 |

TABLE 5

| | Pressing Conditions of B-Stage Sheet | | Porosity (%) | | | | | | |
|---|---|---|---|---|---|---|---|---|---|
| | Temperature (° C.) | Number of Layers | Porosity at Each Pressing Pressure (%) | | | | | | Judgment |
| | | | 2 MPa | 4 MPa | 6 MPa | 8 MPa | 10 MPa | 13 MPa | |
| Example 1 | 120 | 2 | — | — | 5.38 | 2.21 | 0.93 | — | A |
| Example 2 | 120 | 2 | — | — | 4.06 | 1.7 | 1.66 | — | A |
| Example 3 | 120 | 2 | — | — | 2.33 | 0.97 | 1.34 | — | A |
| Example 4 | 120 | 2 | — | — | 1.93 | 1.52 | 3.23 | — | A |
| Example 5 | 120 | 2 | — | — | 2.04 | 1.78 | 1.48 | — | A |
| Example 6 | 120 | 2 | — | — | 1.11 | 0.15 | 0 | — | A |
| Example 7 | 120 | 2 | — | — | 6.42 | 4.26 | 1.5 | — | A |
| Example 8 | 120 | 2 | — | — | — | 1.12 | 1.19 | — | A |
| Example 9 | 120 | 2 | — | — | 7.48 | 4.73 | 2.17 | — | A |
| Example 10 | 120 | 2 | — | — | 4.06 | 2.31 | 1.78 | — | A |
| Example 11 | 120 | 2 | — | — | 1.66 | 0.45 | 1.41 | — | A |
| Example 12 | 120 | 2 | — | — | 2.41 | 0.28 | 1.34 | — | A |
| Example 13 | 120 | 2 | — | — | — | 5.44 | 2.34 | — | A |
| | 120 | 4 | — | — | — | — | 2.29 | — | A |
| | 130 | 2 | — | — | — | 4.85 | 2.74 | — | A |
| Example 14 | 120 | 4 | — | — | — | — | 2.99 | — | A |
| Example 15 | 120 | 4 | — | — | — | — | 2.01 | — | A |
| Example 16 | 130 | 2 | — | — | — | 6.36 | 2.96 | — | A |
| Example 17 | 120 | 2 | — | — | — | 1.32 | 1.15 | — | A |
| Comparative Example 1 | 120 | 2 | — | — | 6.69 | 3.5 | 2.2 | 1.4 | A |
| Comparative Example 2 | 120 | 2 | 1.38 | 0.77 | 0.1 | 0.38 | −0.15 | — | A |
| Comparative Example 3 | 120 | 2 | 1.73 | 1.47 | 1.2 | 0.93 | 0.87 | — | A |
| Comparative Example 4 | 120 | 2 | — | — | 7.71 | 4.83 | 3.28 | — | C |
| Comparative Example 5 | 120 | 2 | — | — | 6.3 | 2.7 | — | — | A |
| Comparative Example 6 | 120 | 2 | — | — | 6.4 | 2.7 | — | — | A |
| Comparative Example 7 | 120 | 2 | — | — | — | 1.38 | 1.68 | — | A |

TABLE 6

| | Pressing Conditions of B-Stage Sheet | | Thermal Conductivity (W/mK) | | | | | | |
|---|---|---|---|---|---|---|---|---|---|
| | Temperature (° C.) | Number of Layers | Thermal Conductivity at Each Pressing Pressure (W/mK) | | | | | | Judgment |
| | | | 2 MPa | 4 MPa | 6 MPa | 8 MPa | 10 MPa | 13 MPa | |
| Example 1 | 120 | 2 | — | — | 11.97 | 13.03 | 11.99 | — | A |
| Example 2 | 120 | 2 | — | — | 13.7 | 13.76 | 13.07 | — | A |
| Example 3 | 120 | 2 | — | — | 14.11 | 13.93 | 13.67 | — | A |
| Example 4 | 120 | 2 | — | — | 14.11 | 13.9 | 13.25 | — | A |
| Example 5 | 120 | 2 | — | — | 13.43 | 12.01 | 13.18 | — | A |
| Example 6 | 120 | 2 | — | — | 12.07 | 15.91 | 14.62 | — | A |
| Example 7 | 120 | 2 | — | — | 12.26 | 12.3 | 13.33 | — | A |

TABLE 6-continued

| | Pressing Conditions of B-Stage Sheet | | Thermal Conductivity (W/mK) Thermal Conductivity at Each Pressing Pressure (W/mK) | | | | | | |
|---|---|---|---|---|---|---|---|---|---|
| | Temperature (° C.) | Number of Layers | 2 MPa | 4 MPa | 6 MPa | 8 MPa | 10 MPa | 13 MPa | Judgment |
| Example 8 | 120 | 2 | — | — | — | 13.6 | 12.98 | — | A |
| Example 9 | 120 | 2 | — | — | 11.54 | 12.24 | 12.58 | — | A |
| Example 10 | 120 | 2 | — | — | 12.87 | 12.75 | 12.29 | — | A |
| Example 11 | 120 | 2 | — | — | 14.75 | 14.3 | 13.37 | — | A |
| Example 12 | 120 | 2 | — | — | 14.28 | 14.53 | 13.78 | — | A |
| Example 13 | 120 | 2 | — | — | — | 15 | 15.29 | — | A |
| | 120 | 4 | — | — | — | — | 15.88 | — | A |
| | 130 | 2 | — | — | — | 15.44 | 16.76 | — | A |
| Example 14 | 120 | 4 | — | — | — | — | 15.12 | — | A |
| Example 15 | 120 | 4 | — | — | — | — | 15.88 | — | A |
| Example 16 | 130 | 2 | — | — | — | 13.18 | 12.85 | — | A |
| Example 17 | 120 | 2 | — | — | — | 12.89 | 12.72 | — | A |
| Comparative Example 1 | 120 | 2 | — | — | 12.82 | 13.17 | 12.48 | 11.89 | A |
| Comparative Example 2 | 120 | 2 | 10.56 | 11.23 | 12.01 | 11.37 | 11.78 | — | C |
| Comparative Example 3 | 120 | 2 | 12.13 | 11.95 | 11.28 | 10.25 | 9.77 | — | C |
| Comparative Example 4 | 120 | 2 | — | — | 11.74 | 11.7 | 12.22 | — | C |
| Comparative Example 5 | 120 | 2 | — | — | 11.59 | 11.87 | — | — | C |
| Comparative Example 6 | 120 | 2 | — | — | 11.74 | 11.93 | — | — | C |
| Comparative Example 7 | 120 | 2 | — | — | — | 12.2 | 11.91 | — | C |

TABLE 7

| | Pressing Conditions of B-Stage Sheet | | Judgment | | | | | | |
|---|---|---|---|---|---|---|---|---|---|
| | Temperature (° C.) | Number of Layers | 2 MPa | 4 MPa | 6 MPa | 8 MPa | 10 MPa | 13 MPa | Overall Judgment |
| Example 1 | 120 | 2 | — | — | C | A | C | — | A |
| Example 2 | 120 | 2 | — | — | C | AA | AA | — | AA |
| Example 3 | 120 | 2 | — | — | A | AA | AA | — | AA |
| Example 4 | 120 | 2 | — | — | AA | AA | C | — | AA |
| Example 5 | 120 | 2 | — | — | A | C | AA | — | AA |
| Example 6 | 120 | 2 | — | — | A | AA | AA | — | AA |
| Example 7 | 120 | 2 | — | — | C | C | AA | — | AA |
| Example 8 | 120 | 2 | — | — | — | AA | A | — | AA |
| Example 9 | 120 | 2 | — | — | C | C | A | — | A |
| Example 10 | 120 | 2 | — | — | C | A | C | — | A |
| Example 11 | 120 | 2 | — | — | AA | AA | AA | — | AA |
| Example 12 | 120 | 2 | — | — | A | AA | AA | — | AA |
| Example 13 | 120 | 2 | — | — | — | C | A | — | A |
| | 120 | 4 | — | — | — | — | A | — | A |
| | 130 | 2 | — | — | — | C | A | — | A |
| Example 14 | 120 | 4 | — | — | — | — | A | — | A |
| Example 15 | 120 | 4 | — | — | — | — | A | — | A |
| Example 16 | 130 | 2 | — | — | — | C | A | — | A |
| Example 17 | 120 | 2 | — | — | — | A | A | — | A |
| Comparative Example 1 | 120 | 2 | — | — | C | C | C | C | C |
| Comparative Example 2 | 120 | 2 | C | C | C | C | C | — | C |
| Comparative Example 3 | 120 | 2 | C | C | C | C | C | — | C |
| Comparative Example 4 | 120 | 2 | — | — | C | C | C | — | C |
| Comparative Example 5 | 120 | 2 | — | — | C | C | — | — | C |

TABLE 7-continued

| | Pressing Conditions of B-Stage Sheet | | Judgment | | | | | | |
|---|---|---|---|---|---|---|---|---|---|
| | Temperature | Number | Judgment at Each Pressing Pressure | | | | | | Overall |
| | (° C.) | of Layers | 2 MPa | 4 MPa | 6 MPa | 8 MPa | 10 MPa | 13 MPa | Judgment |
| Comparative Example 6 | 120 | 2 | — | — | C | C | — | — | C |
| Comparative Example 7 | 120 | 2 | — | — | — | C | C | — | C |

It is seen also from the results above that according to the present invention, a thermal conductive polymer composition with low probability for mixing of an air bubble in a thermal conductive molded article can be obtained.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2014-093649) filed on Apr. 30, 2014, the entirety of which is incorporated herein by way of reference.

The invention claimed is:

1. A thermal conductive molded article comprising a thermal conductive polymer composition comprising:
   thermal conductive inorganic particles; and an electrically insulating polymer,
   wherein the thermal conductive inorganic particles comprise a first component containing boron nitride particles in an aggregated state and a second component which is a component other than the first component,
   the second component includes aluminum nitride particles or aluminum oxide particles,
   a content of the second component in the thermal conductive inorganic particles is from 5 to 55 vol %,
   the thermal conductive inorganic particles of the second component have a volume average particle diameter of 15 μm or more, and
   the thermal conductive inorganic particles satisfy all requirements of the following (1) to (3):
   (1) to contain particles having a particle diameter of 10 μm to 400 μm in an amount of 80 vol % or more,
   (2) to contain particles having a particle diameter of 20 μm to 400 μm in an amount of 60 vol % or more, and
   (3) to contain particles having a particle diameter of 30 μm to 400 μm in an amount of 40 vol % or more
   wherein a part or the whole of the thermal conductive molded article is formed of the thermal conductive polymer composition, and
   a porosity of the part or the whole formed of the thermal conductive polymer composition is 3% or less.

2. The thermal conductive molded article according to claim 1, wherein a thermosetting resin is contained as the electrically insulating polymer.

3. The thermal conductive molded article according to claim 1, which is a thermal conductive sheet obtained by molding the thermal conductive polymer composition into a sheet shape.

* * * * *